United States Patent [19]

Britman

[11] Patent Number: 5,193,068
[45] Date of Patent: Mar. 9, 1993

[54] METHOD OF INDUCING OFF-CIRCUIT BEHAVIOR IN A PHYSICAL MODEL

[75] Inventor: Sergiu A. Britman, Ottawa, Canada

[73] Assignee: Northern Telecom Limited, Montreal, Canada

[21] Appl. No.: 590,832

[22] Filed: Oct. 1, 1990

[51] Int. Cl.$^5$ .................... G06F 11/00; G06F 15/20
[52] U.S. Cl. .................... 364/578; 364/488; 371/23
[58] Field of Search .......... 364/488, 489, 578; 371/23

[56] References Cited

U.S. PATENT DOCUMENTS

| | | | |
|---|---|---|---|
| 4,590,581 | 5/1986 | Widdoes, Jr. | 364/578 |
| 4,635,218 | 1/1987 | Widdoes, Jr. | 364/578 |
| 5,051,938 | 9/1991 | Hyduke | 364/578 |
| 5,068,812 | 11/1991 | Schaefer et al. | 364/578 |
| 5,084,824 | 1/1992 | Lam et al. | 364/578 |
| 5,105,362 | 4/1992 | Kotani | 364/578 |
| 5,111,413 | 5/1992 | Lazansky et al. | 364/578 |

Primary Examiner—Vincent N. Trans
Attorney, Agent, or Firm—F. P. Turpin

[57] ABSTRACT

A simulation model is provided which comprises a combination of software models and a hardware model. Induced off-circuit behavior of the hardware model during simulation is achieved by presenting it with off-circuit input patterns and sampling the resulting output patterns. After sampling, the hardware model is reset to its state prior to the presentation of the off-circuit patterns thereby causing the simulation to resume and preserving the integrity of the simulation.

6 Claims, 3 Drawing Sheets

METHOD OF INDUCING OFF-CIRCUIT BEHAVIOR IN A PHYSICAL MODEL

FIELD OF THE INVENTION

This invention relates to modeling of operation of complex large scale integration (LSI) or very large scale integration (VLSI) digital devices for use in development and testing of digital systems. More specifically the invention relates to logic simulation and testing of complex digital circuitry and systems including those capable of executing instructions under program control in which digital performance characteristics of static or dynamic LSI or VLSI devices must also be accurately simulated.

BACKGROUND OF THE INVENTION

A logic-simulation model of a device is a diagnostic tool which accurately mimics digital logic and timing behavior of a device in normal operation. The purpose of such a model is to verify both logic and timing of an operational digital system containing the device. In a logic-simulation model, internal operation and internal structure need not be similar to that of the actual device being simulated. The only prerequisite is that the simulated operation and simulated timing as externally observed be identical to that of the actual device being modeled.

Traditionally, logic-simulation models have been implemented with software. Software logic-simulation models have been of two types, namely structural models and behavioral models. A structural model mimics actual internal logical structure of a device from which observable functional behavior follows. A behavioral model merely mimics external logical and timing behavior.

Software models of complex devices have numerous disadvantages. First, they are relatively costly and time consuming to develop. To design an accurate model, specifications of the device must be gathered and thoroughly understood. This has been a serious limitation because manufacturers of devices are generally reluctant to disclose such details. Moreover, the specifications required for modeling a device are typically much more detailed than those relevant to a typical user of the device.

Second, software simulation models are characteristically slow because of the amount of computation required to simulate device functions. Typically, the amount of computation required to simulate external components in a full system being modeled is negligible compared with the amount of computation required for the complex device itself. In fact, software logic simulation models are frequently too slow to be of practical utility.

As complex devices become more dense, the problems of simulation, including development cost, model accuracy, and the requirements to simulate at high speed can be expected to become acute. U.S. Pat. Nos. 4,590,581 and 4,635,218 issued in the name of C. L. Widdoes discloses a method and apparatus for modeling systems of complex circuits and a method for simulating system operation of static and dynamic circuit devices, respectively.

U.S. Pat. No. 4,590,581 discloses a model which comprises a combination of a physical device to be modeled and means for controlling the physical device at normal operating speeds so as to avoid loss of data or of accumulated functions. Specifically, the physical device to be modeled is connected through a micro-system simulation means which can accept any of a wide variety of external devices and which includes the logic circuitry and control means necessary to allow the physical device to be stimulated and the resulting behavior observed under external control. Data and logic state patterns are preserved by effective control of the starting, stopping, cycling and resetting of the physical device. A known good physical sample of the device being modeled, for example a dynamic digital circuit, such as a microprocessor circuit is employed in connection to a digital system to be tested, the system including other digital circuits to be tested in the environment of the system. The physical sample, referred to as the reference element, is coupled through a device referred to as a personality module to a device called a simulation jig. The purpose of the personality module is to provide the electrical and physical configurations for interfacing the specific reference element with the simulation jig. The simulation jig is coupled to a computer controlled system designated a logic-simulator to provide appropriate input signals and to sample the resulting output signals in such a way that the user need not be aware that the reference element is either a software or a hardware model. In fact, a user of a simulation library may mix devices having software models with devices having physical models without concern about type.

In a specific implementation of Widdoes' invention, a first input pattern is precomputed and stored in a fast memory. An input pattern is the parallel pattern of bits presented during an interval of time (e.g., at a clock edge) to the reference element. Before the reference element is initially exercised it is first reset or restored to a preselected condition which can be identically restored at any future time. The first or initial input pattern termed the first "sequence" is typically fetched from the fast memory and presented to input terminals of the reference element to cause the reference element to respond to produce an output pattern. The output values resulting from the first input pattern are termed the first output pattern. Thereafter, the resultant first output pattern of the reference element is recorded. Using the first output pattern, the logic simulator computes a second input pattern which is then stored in the fast memory along with the first input pattern, thereby creating a second sequence. The second sequence thus consists of the first and second input patterns. The reference element is reset to prepare to receive the second sequence. Thereafter the second sequence is played back to the reference element by sequentially presenting to the reference element the first two input patterns at a preselected rate. After the end of the second sequence of input patterns has been played back to the reference element, the second output pattern of output values of the reference element is sampled. Employing the resultant output pattern, the logic simulator may compute off-line the next input pattern, store this computed input pattern at the end of the sequence of input patterns previously stored, reset the reference element, either by activating a reset signal line or by applying a reset pattern sequence to the reference element and then repeat the sequence of input patterns such that the next operational sequence produces one additional input pattern.

The logic simulator iteratively advances the state of the reference element by starting each sequence of iterations from a reference state designated the reset state.

Although Widdoes provides the capability of presenting the reference element with a reset sequence, there is no capability of presenting an off-circuit sequence which will produce a desired off-circuit behavior in the reference element. For example, if a specific sequence were presented to the reference element evoking a read operation of a register within the reference element, the sequence would modify normal activity in the simulated circuit. Indeed if such a sequence were appended to the previously accumulated input patterns as taught in the prior art, pattern memory would be altered; any subsequent pattern replay would include the replay of the specific read sequence and thus alter the natural flow of circuit events.

It is therefore an object of the invention to provide the capability of causing the system to generate desired off-circuit results during a simulation without affecting the natural behavior of the circuit being simulated.

SUMMARY OF THE INVENTION

The invention provides the capability of presenting a number of off-circuit input patterns to the reference element during simulation in order to determine its response to those patterns without adversely affecting the simulation results. In a particular embodiment, the invention provides the capability of presenting the reference element with a predetermined sequence which will allow the reading of the contents of internal readable registers within the reference element while maintaining the integrity of the circuit simulation.

In a simulation system which produces digital input patterns for input to a model of a complex digital device, the operation of the device being modelled within the simulation system by the method steps of:

a) presenting a first sequence of the digital input patterns to a reference element which is a physical specimen of the complex digital device to produce a digital output pattern, wherein the presenting step occurs at a clock rate which differs from the rate at which the digital input patterns are produced by the simulation system;

b) sampling the digital output pattern after the first sequence of the digital input patterns has been presented to the complex digital device;

c) allowing the simulation system to respond to the digital output pattern in (b) to produce the next one of the digital input patterns;

d) storing the next one of the digital input patterns in succession with the first sequence of the digital input patterns to produce a second sequence of the digital input patterns;

e) resetting the reference element independent of operation of the simulation system; and f) repeating steps (a) through (e), the second sequence becoming the first sequence;

a method of inducing off-circuit behavior of the complex digital device, the method comprising the ordered steps of:

i) after performing step (b) above, storing an off-circuit digital input sequence in succession with the first sequence to produce a mixed sequence;

ii) resetting the reference element independent of operation of the simulation system;

iii) presenting the mixed sequence to the reference element; and iv) sampling the digital output pattern resulting from the presentation of the mixed sequence.

The invention thus provides the capability of inducing off-circuit behavior into the reference element without affecting the integrity of the overall simulation.

BRIEF DESCRIPTION OF THE DRAWINGS

The invention will be described in conjunction with the accompanying drawings in which.

DETAILED DESCRIPTION

Figure 1:
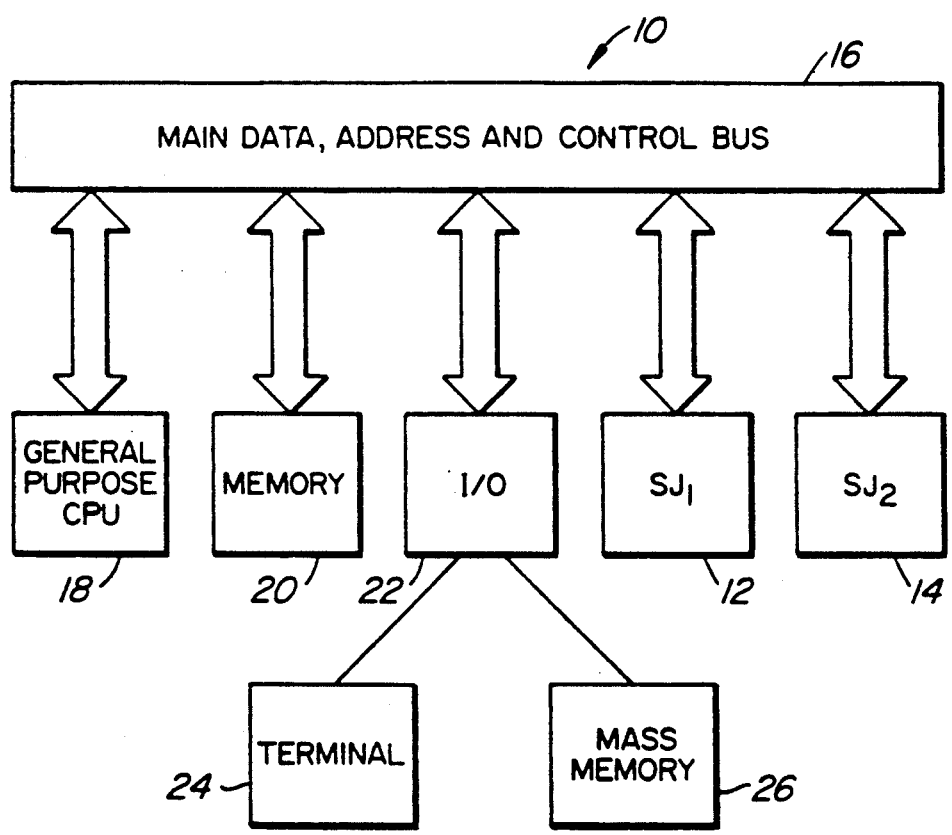
FIG. 1 is a block diagram of a prior art simulation system with simulation modeling apparatus.

Referring to FIG. 1, there is shown a simulation system 10 as might be configured in a general purpose digital computer having a general purpose central processing unit (CPU) 18 coupled to a main bus 16. The simulation system further may include a memory means 20 and input/output means (I/O) 22 coupled to the main bus 16. A control terminal 24 and mass memory 26 are coupled through the I/O 22 to the main bus 16. Whereas a completely software-based simulation requires no other hardware, a first simulation jig 12 ($SJ_1$) and/or a second simulation jig 14 ($SJ_2$) may be coupled to the main bus 16. The function of the simulation jigs is explained in connection with figure 2.

Figure 3:
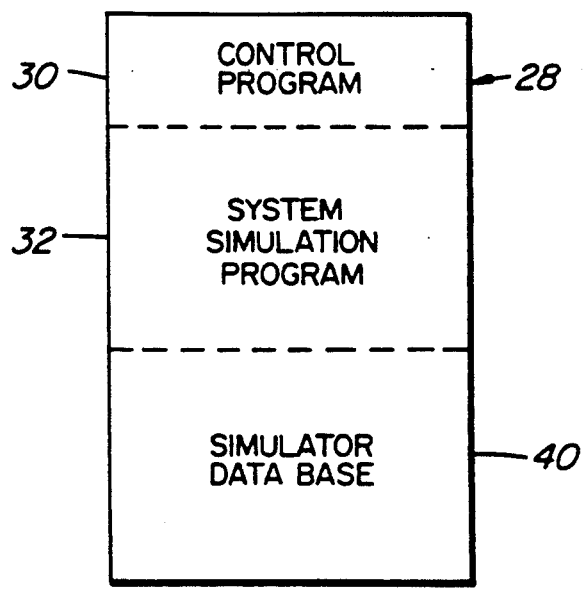
FIG. 3 is a representation of a memory map of a computer controlled simulation system.

FIG. 3 shows schematically how the software of the simulation system 10 may be organized in a memory map 28 of the memory 20. Memory space is set aside for a computer system control program 30 in a first memory address space of memory 20. A system simulation program 32 is stored as object code in a second address space. A simulator data base containing working data values for the system simulation program is stored on line in memory address space 40. Memory address space 40 is also used to store data as required by the simulation program from the mass memory 26.

Figure 2:
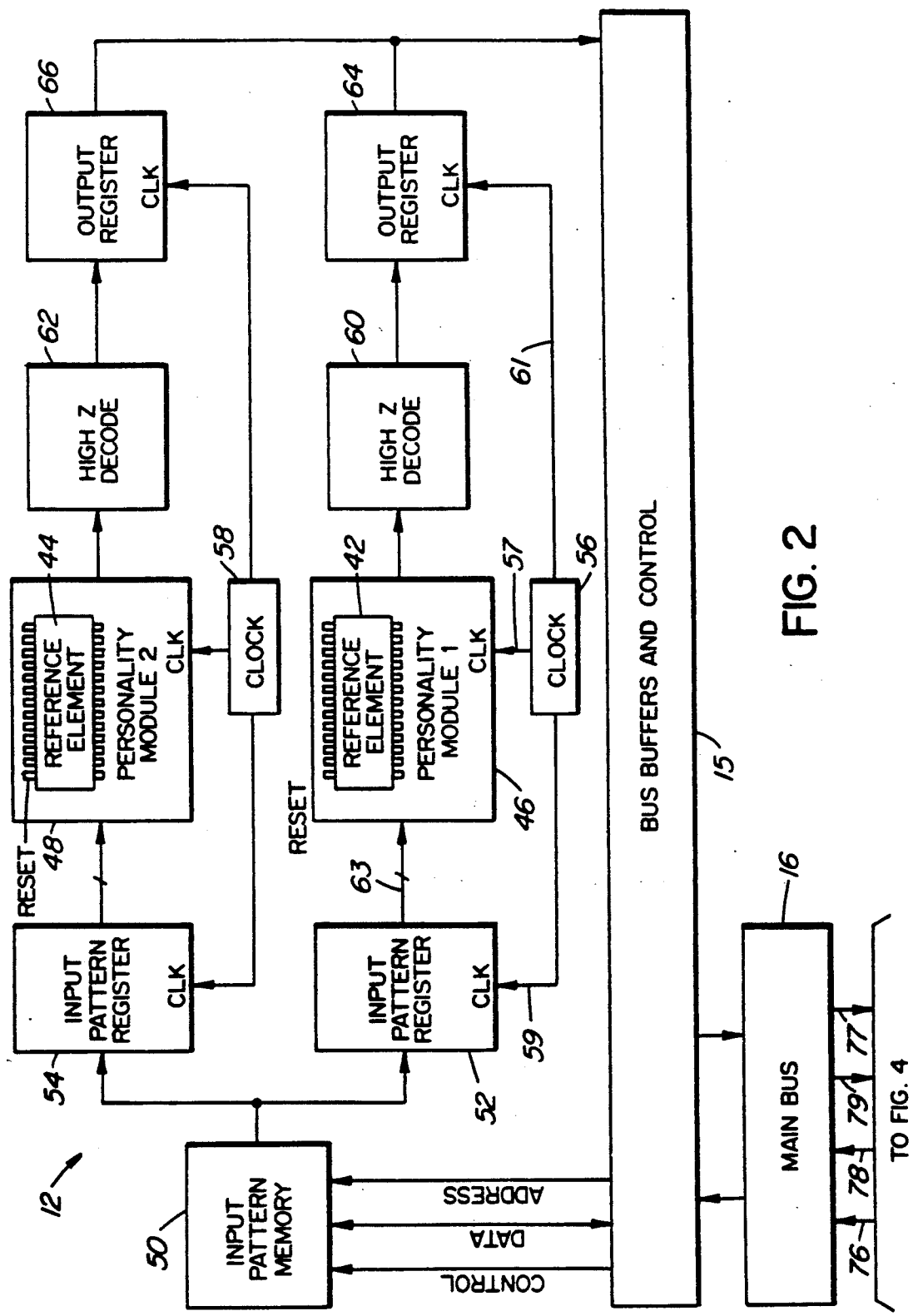
FIG. 2 is a block diagram of a micro-system simulation jig.

FIG. 2 may be used to describe the operation of a simulation jig 12 operative to present input patterns through an input pattern register 52 to a device herein known as a reference element 42. (Most control signal lines have not been shown to avoid unnecessary complexity. Implementation of control functions is within the skill of the ordinary designer from the present description.) One or more clock signals having preselectable shape, clock rate and relative phase relationship may be presented by a clock 56 via clock lines 57, 59 and 61 to a personality module 46, the input pattern register 52 and the output register 64. The personality module 46 is a customized interface device which provides signal level matching and suitable socket for a general purpose simulation jig 12. The simulation jig 12 is operative to present a set of input signals to the reference element 42 synchronous with the clock 56, which input signals represent values stored in an input pattern memory 50 containing the full set of defined input signal patterns in logical sequence. The input pattern memory 50 may be a serial or random access memory device with control lines and ports appropriate to the type of memory element selected.

At a fixed time before each clock edge, the input pattern register 52 of the simulation jig 12 is operative to present each set of defined input values to the reference element 42 via coupling 63. The reference element 42 is operative to produce output signals as if it were operating in a real-time environment in response to the defined input signal pattern. However the output signals are ignored by the data recovery element, namely the output register 64, until all available input patterns in a sequence have been presented to the reference element 42. After the last input pattern has been presented to the reference element 42, clocking stops. An interval follows which is greater than the maximum specified delay of any output of the reference element 42 generated in response to any clock edge. Thereupon, the output values are sampled and stored in the output register 64. Thereafter, the simulator system 10 (FIG. 1), to which the simulation jig 12 is coupled via bus buffers and control 15 and main bus 16, examines the state of each output of the reference element 42. The states are evidenced by the values in the output register 64. The simulator system 10 then schedules the simulated outputs in the simulator data base 40 to change at specific delay times after the corresponding simulated clock edge. The specified delay time for each output is a function of the identity of the output and the specific clock edge which causes the change. It can be set to any time value between the minimum and the maximum delay as specified by the manufacturer and is a parameter which is specified in the definition of the device corresponding to the reference element 42.

As is taught in the prior art, the simulator system 10, having set up a schedule for simulated output signals from the reference element 42, proceeds to advance the state of the simulator data base 40 by computing the other necessary values and advancing simulated time until the occurrence of the next simulated clock edge. The simulation system 10 then records the instantaneous values of the simulated input signals which are defined for the reference element 42 and stores them in the next location in the input pattern memory 50. The simulation system then generates a reset pattern sequence or a reset signal which is conveyed to the reference element 42 via one or more of the lines of coupling 63 and prepares the reference element 42 to repeat the process of cycling through all patterns. Thereafter, the entire set of defined input signal patterns, including the newly computed pattern is presented in sequence to the reference element 42 through the personality module 46 within the predefined time tolerance for the input signals. This process is repeated until all operations of a simulation have been executed and all defined patterns of a sequence applied to the reference element 42 have been executed at the input pattern clock rate, the number of steps in the defined pattern being incremented by generally one clock cycle with each advance in the clock of the simulation system 10.

Figure 4:
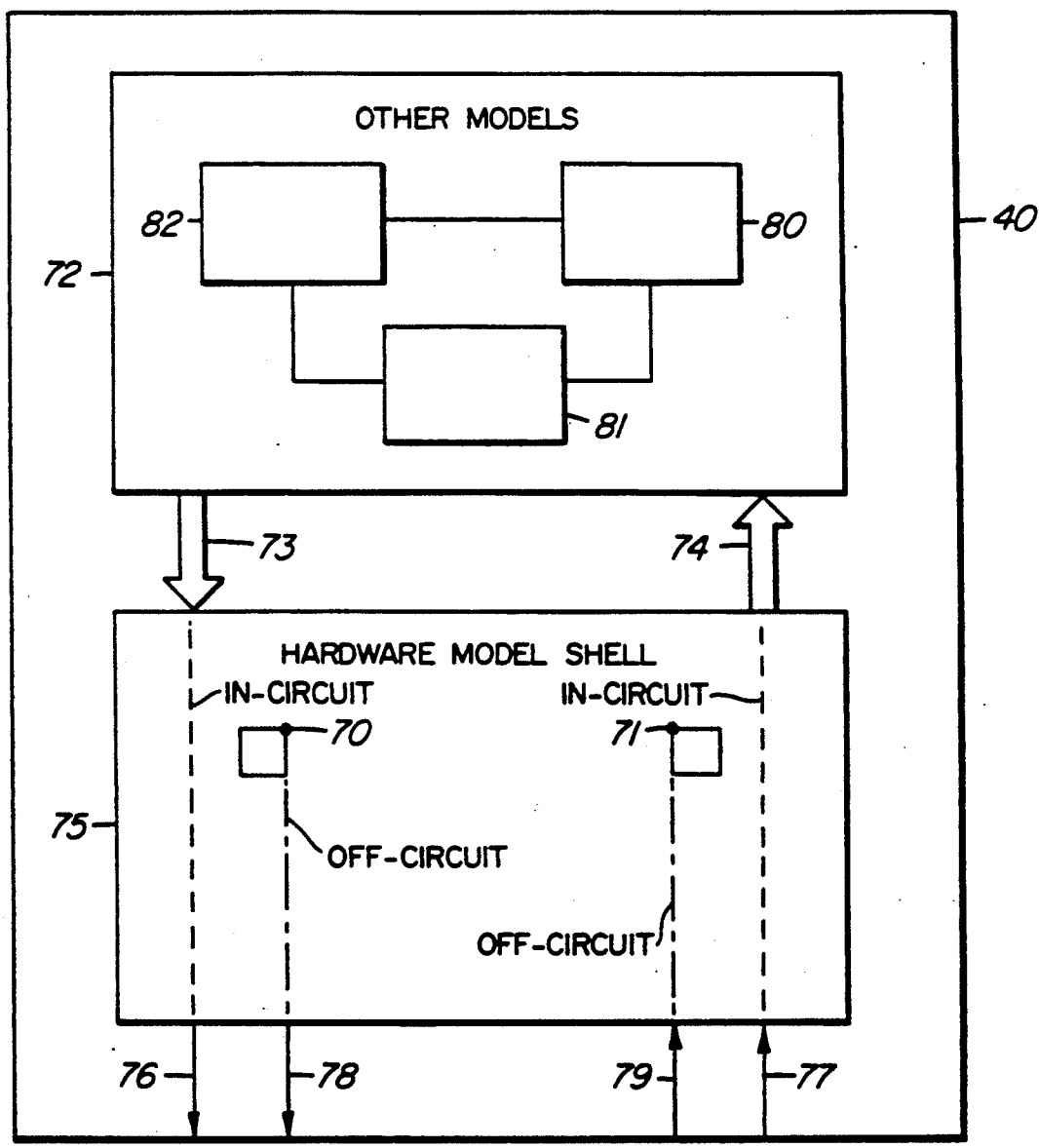
FIG. 4 is a functional block representation of a portion of the memory map shown in FIG. 3.

Referring to FIG. 4, the simulated digital circuit is represented in memory 40 by several software constructs, most notably by a software shell 75 associated with the hardware model under scrutiny, and by a set 72 of models 80, 81 and 82, describing other circuit entities.

During simulation, shell 75 receives natural in-circuit input signals 73 generated by model set 72, sends them to jig 12 as input patterns 76, obtains the output patterns 77 back from jig 12 and injects them into model set 72 as natural in-circuit output signals 74.

Signal patterns 70, not directly related to in-circuit input signals 73 (and therefore termed "off-circuit" input signals) are programmed into shell 75, and are sent to jig 12 as input patterns 78 and stored in input pattern memory 50. The corresponding output patterns 79 back from jig 12 is retained and used in shell 75 as off-circuit signal patterns 71, representing an off-circuit behavior. In particular, signal patterns 70 may describe the sequence necessary to read an internal register of reference element 42 and signal patterns 71 the contents of that register. The read operation would not have been otherwise induced by the natural flow of in-circuit input signals 73.

Signal patterns 70 could be completely independent of in-circuit signals 73, in which case they may be predetermined at programming time and sent to jig 12 only once initially. If off-circuit inputs 70 depend on run-time conditions they are sent to jig 12 at the appropriate simulated times when those conditions are met and the desired off-circuit behavior is required.

Off-circuit input patterns 78 become operational after in-circuit output patterns 77 have been returned to shell 75 and before simulation proceeds by passing in-circuit outputs 74 back to model set 72. Specifically, the off-circuit input patterns are stored in pattern memory 50 in succession with the in-circuit patterns accumulated until that point creating a mixed sequence. The reference element is reset then presented with the mixed sequence and is sampled to produce the off-circuit output patterns 79. In an alternative but less effective method, the off-circuit input patterns may be processed in an iterative fashion. After a first mixed sequence is stored as in-circuit patterns plus the first off-circuit pattern, a loop is entered in which the reference element is reset then presented with the mixed sequence, then a new mixed sequence is obtained by appending the next off-circuit pattern at the back of the current mixed sequence. The iteration ends with the last off-circuit input pattern and the reference element being sampled to produce off-circuit output patterns 79.

A crucial ingredient of the procedure is the ability to restore the sequence of natural in-circuit input patterns in pattern memory 50 following the injection of off-circuit patterns. This is accomplished by proper management of memory pointers or by save-restore methods, such that the replay of patterns stops at the last in-circuit pattern when the reference element has to produce natural output patterns 77. Pointer management and save-restore techniques have long been known and are well within the capability of the current art.

I claim:

1. In a simulation system which produces digital input patterns for input to a model of a complex digital device, the operation of the device being modelled within the simulation system by the method steps of:
   a) presenting a first sequence of the digital input patterns to a reference element which is a physical specimen of the complex digital device to produce a digital output pattern, wherein the presenting step occurs at a clock rate which differs from the rate at which the digital input patterns are produced by the simulation system;
   b) sampling the digital output pattern after the first sequence of the digital input patterns has been presented to the complex digital device;
   c) allowing the simulation system to respond to the digital output pattern in (b) to produce the next one of the digital input patterns;
   d) storing the next one of the digital input patterns in succession with the first sequence of the digital input patterns to produce a second sequence of the digital input patterns;

e) resetting the reference element independent of operation of the simulation system; and f) repeating steps (a) through (e), the second sequence becoming the first sequence;

a method of inducing off-circuit behavior of the complex digital device, the method comprising the ordered steps of:

i) after performing step (b) above, storing an off-circuit digital input sequence in succession with the first sequence to produce a mixed sequence;

ii) resetting the reference element independent of operation of the simulation system;

iii) presenting the mixed sequence to the reference element; and iv) sampling the digital output pattern resulting from the presentation of the mixed sequence.

2. The method according to claim 1 further comprising the step of:

storing the off-circuit sequence in a memory means prior to presenting step (a).

3. In a simulation system which produces digital input patterns for input to a model of a complex digital device, the operation of the device being modelled within the simulation system by the method steps of:

a) presenting a first sequence of the digital input patterns to a reference element which is a physical specimen of the complex digital device to produce a digital output pattern, wherein the presenting step occurs at a clock rate which differs from the rate at which the digital input patterns are produced by the simulation system;

b) sampling the digital output pattern after the first sequence of the digital input patterns has been presented to the complex digital device;

c) allowing the simulation system to respond to the digital output pattern in (b) to produce the next one of the digital input patterns;

d) storing the next one of the digital input patterns in succession with the first sequence of the digital input patterns to produce a second sequence of the digital input patterns;

e) resetting the reference element independent of operation of the simulation system; and f) repeating steps (a) through (e), the second sequence becoming the first sequence;

a method of inducing off-circuit behavior of the complex digital device, the method comprising the ordered steps of:

i) after performing step (b) above, storing a first off-circuit pattern in succession with the first sequence to produce a first mixed sequence;

ii) resetting the reference element independent of operation of the simulation system;

iii) presenting the first mixed sequence to the reference element;

iv) storing the next off-circuit pattern in succession with the first mixed sequence to produce a second mixed sequence and repeating steps (ii) to (iv), the second mixed sequence becoming the first mixed sequence until the last off-circuit pattern has been processed; and v) sampling the digital output pattern resulting from the presentation of the second mixed sequence.

4. The method according to claim 3 further comprising the step of:

storing the off-circuit patterns in a memory means prior to presenting step (a).

5. In a simulation system which produces digital input patterns for input to a model of a complex digital device, the operation of the device being modelled within the simulation system by the method steps of:

a) presenting a first sequence of the digital input patterns to a reference element which is a physical specimen of the complex digital device to produce a digital output pattern, wherein the presenting step occurs at a clock rate which differs from the rate at which the digital input patterns are produced by the simulation system;

b) sampling the digital output pattern after the first sequence of the digital input patterns has been presented to the complex digital device;

c) allowing the simulation system to respond to the digital output pattern in (b) to produce the next one of the digital input patterns;

d) storing the next one of the digital input patterns in succession with the first sequence of the digital input patterns to produce a second sequence of the digital input patterns;

e) resetting the reference element independent of operation of the simulation system; and f) repeating steps (a) through (e), the second sequence becoming the first sequence;

a method of inducing off-circuit behavior of the device, the method comprising the ordered steps of:

i) after performing step (b) above storing a first off-circuit pattern in succession with the first sequence to produce a first mixed sequence;

ii) resetting the reference element independent of operation of the simulation system;

iii) presenting the first mixed sequence to the reference element; and iv) sampling the digital output pattern resulting from the presentation of the first mixed sequence; and v) storing the next off-circuit pattern in succession with the first mixed sequence to produce a second mixed sequence and repeating steps (ii) to (v), the second mixed sequence becoming the first mixed sequence until the last off-circuit pattern has been processed.

6. The method according to claim 5 further comprising the step of:

storing the off-circuit pattern in a memory means prior to presenting step (a).

* * * * *